Nov. 20, 1951  H. D. TAYLOR  2,575,932
DYNAMOELECTRIC MACHINE ROTOR AND WINDING
Filed Nov. 5, 1949
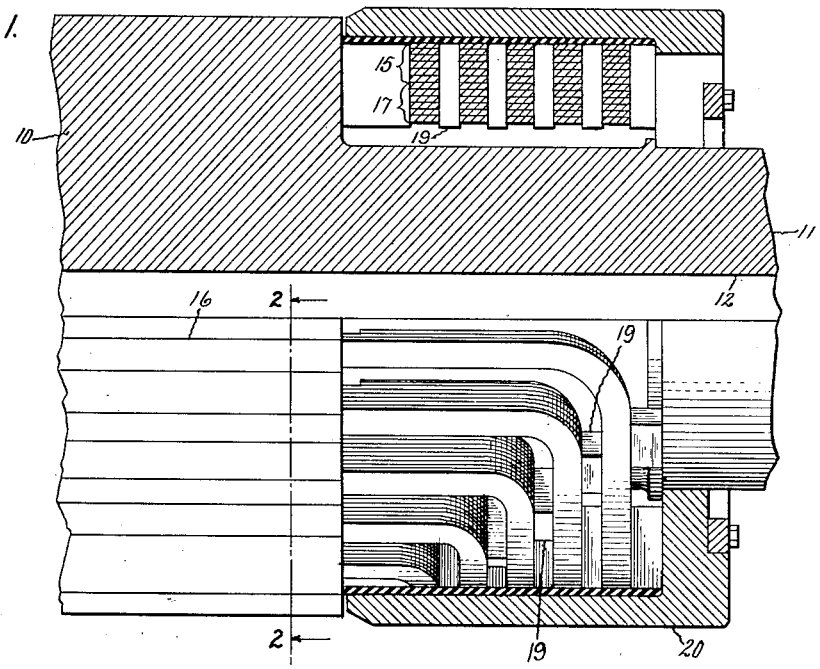
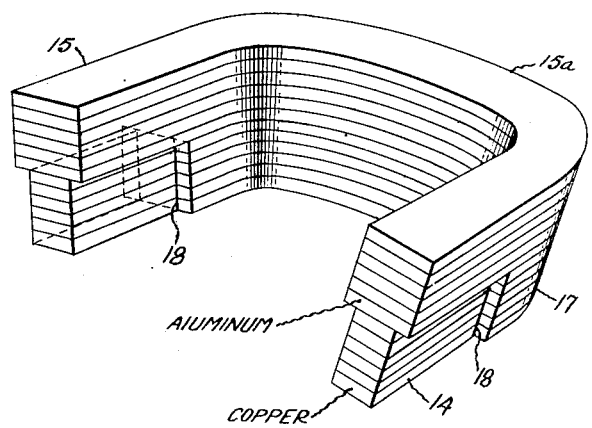
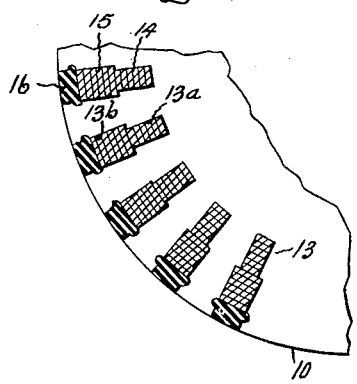
Inventor:
Hamilton D. Taylor,
by Ernest C. Britton
His Attorney.

Patented Nov. 20, 1951

2,575,932

UNITED STATES PATENT OFFICE 2,575,932

DYNAMOELECTRIC MACHINE ROTOR AND WINDING

Hamilton D. Taylor, Schenectady, N. Y., assignor to General Electric Company, a corporation of New York Application November 5, 1949, Serial No. 125,815

6 Claims. (Cl. 171—206)

1

My invention relates to rotors and rotatable windings for dynamoelectric machines and has particular significance in connection with rotor field windings for high speed turbine generators.

Conventionally, generators adapted to be driven by large steam turbines, to supply large amounts of power, have a stationary outer core member having an armature winding adapted to provide the alternating current output of the machine. Excitation is provided by a rotatable member having a core of magnetic material and a field exciting winding adapted to be energized by direct current. The field windings are generally contained in slots extending the axial length of the rotor body and the winding turns are completed at each end of the slots by circumferentially extending end turns exposed to cooling air. Retaining rings are used to hold the end turns in place and the slot portions of the windings are held in the core slots by slot wedges. With the modern demand for high-speed generators of larger ratings (e. g., above 100,000 kv. a.) the rotor must be increased either in diameter or length or both (as compared with existing smaller ratings), and there are then encountered numerous mechanical limitations of design which heretofore have not been satisfactorily resolved. Among the design limitations heretofore preventing increased ratings of such machines have been increased centrifugal crushing pressure on the field coil insulation under the wedges, increased centrifugal tooth root stresses, increased centrifugal rotor bursting stresses, and increased centrifugal hoop stresses in the retaining rings which support the coils at each end of the rotor body portion.

Furthermore, for any given design, there is a critical speed which determines the vibrational characteristics of the rotor. The critical speed depends on the stiffness of the rotor in relation to its weight, and these in turn on the rotor diameter and length. If there is an increase in diameter, a higher critical speed may be achieved, but with every increase in diameter there is a corresponding increase (for a given speed) of centrifugal forces, which lead to higher stresses for similar design proportions.

It is an object of the present invention to provide simple and inexpensive means for overcoming the above-mentioned difficulties.

It is a further object of the present invention to provide an improved rotor winding permitting the construction of a large turbine generator of relatively short length, with consequent increase

2 of critical speed for a given rating, or consequent higher output rating for any given limitation as to critical speed.

A still further object of the present invention is to provide an improved rotatable winding for a dynamoelectric machine.

In the illustrated embodiment of the invention, the means employed comprises relatively wide light-weight conductors in the radially outer portions of each rotor winding slot, somewhat narrower heavy-weight conductors in the radially inner portion of each rotor winding slot and uniform width light-weight conductors for all end turns.

Other objects and advantages will become apparent and our invention will be better understood from consideration of the following description taken in connection with the accompanying drawing. In the drawing Fig. 1 is a side elevational view, partly in section, of a broken away portion of a turbine generator rotor provided with my improved field exciting winding; Fig. 2 is a cross-sectional view taken on the line 2—2 of Fig. 1; and Fig. 3 is a perspective view showing the arrangement including the end portions of the turns for one coil of the winding shown in Figs. 1 and 2.

In Fig. 1 an end of a rotatable member core 10 of magnetic material, is shown formed integral with a shaft 11 which is provided with a center bore 12 (for purposes of inspection). The rotor core is provided with a plurality of axially extending winding slots 13 as indicated in the cross-sectional view, Fig. 2. As shown in Fig. 2, each winding slot 13 has a relatively narrow radially innermost portion 13a, and a relatively wide radially outer portion 13b. The narrow (or bottom) portion 13a of each slot contains axially extending straps 14 of good conductor material such as copper and the wide (or top) portion 13b of each slot contains axially extending straps 15 of light-weight conductor material such as aluminum. One advantage of the construction is that the heavier conductor material (copper) is located at a smaller radius from the shaft center than the lighter conductor material (aluminum), so that the centrifugal force of the whole winding is appreciably less than if this arrangement were reversed, thus reducing centrifugal stresses. In addition, the lighter conductor material (aluminum) which has somewhat poorer electrical conductivity, and therefore requires more cross-sectional area per turn, is located at a greater radial distance from the shaft center, where a greater width of slot can be used to accommodate it, without cutting down the tooth section to a point which would impair the mechanical strength or flux-carrying capacity of the teeth. As also shown in Fig. 2, the slot conductors are held in place by slot wedges 16 of conventional material, and they are insulated from each other and from the slot walls by conventional means (not shown).

The end turns of the aluminum conductors 15 comprises extensions 15a formed integral with these conductors. However, it is most advantageous to have all end turns of the same width for otherwise there is a very difficult, if not impossible, job of properly blocking and securing the end portions of the winding. Consequently, I use wide aluminum end turns 17 (of the same width as the end turns 15a just mentioned but of the same thickness as the copper conductors 14) to complete the winding for the copper conductors 14 securing these end turns 17 to the copper conductors by any suitable means such as butt welds at the joints indicated at 18 in Fig. 3. The described arrangement of end turns works out nicely because the resistivity of aluminum is somewhat higher than that of copper, so that in spite of the improved ventilation on the end portions it is necessary to make the aluminum end portions wider than the copper slot conductors to which they are attached.

In conventional manner the end turns are blocked apart by insulating spacers 19 and held against centrifugal force preferably by an end turn retaining ring 20 (one at each end of the rotor) which is additionally insulated from the individually insulated end turns 15a. It will be obvious that the use of light-weight end turns (as of aluminum) will help materially to keep the retaining ring stresses within safe practical limits in large diameter rotors, and the described construction will also mean that the crushing pressures on all insulation may readily be kept well within safe values, and the tooth root and bore stresses will be relatively low; therefore, a large machine may be made of greater diameter and shorter length for a specified rating and, consequently, have a stiffer rotor with a higher critical speed; or alternatively, a higher output may be obtained within any given limitation as to critical speed.

There is thus provided a device of the character described capable of meeting the objects hereinabove set forth.

While I have illustrated and described a particular embodiment of my invention, modification thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A winding for a dynamoelectric machine slotted rotor core, said winding comprising axially extending bars of conductor material located in a radially inner portion of each rotor slot, axially extending bars of greater width than said first-mentioned bars and of lighter weight poorer conductor material than said first-mentioned bars and located in a radially outer portion of each rotor slot, end turns for said second-mentioned bars comprising integral extensions thereof, and end turns connected to said first-mentioned axially extending bars, said last-mentioned end turns comprising conductors of the same material and width as said first-mentioned end turns.

2. In a dynamoelectric machine with a cylindrical type rotor having longitudinal slots, a rotor field winding containing two different conductor materials, with said rotor winding having different widths of said two materials in said slots and a uniform width of only one of said materials in end portions of said winding outside of said slots, whereby various design requirements may be readily met.

3. A dynamoelectric machine rotor having slots, and a winding partially in said rotor slots and comprising coils having sides in the slot portion partly of cuprous material, with aluminum end turns connected thereto, and partly of aluminum with continuous aluminum end turns of the same width as said first-mentioned aluminum end turns formed integral therewith.

4. In a dynamoelectric machine with a cylindrical type rotor having longitudinal slots, a rotatable field winding comprising coils having longitudinal sides in said slots each of said sides containing both aluminum conductors of one uniform width and copper condutcors of a different uniform width, with said coils having end turns containing aluminum conductors of uniform width respectively connected to all of the conductors of said longitudinal coil sides.

5. A turbine generator slotted rotor having a field winding comprising coils having turns in slot portions partly of cuprous material with aluminum end turns butt-welded thereto, and partly of aluminum with continuous aluminum end turns of the same width as said first-mentioned aluminum end turns formed integral therewith, with said cuprous turns in the slot portion of said rotor being located radially inward with respect to said aluminum turns in the slots.

6. In a dynamoelectric machine with a cylindrical type rotor having longitudinal slots which are stepped in cross-section from a radially innermost narrow width to a radially outermost wide width, rotatable field winding comprising copper conductors in said radially innermost slot portions and aluminum conductors in the radially outermost slot portions and having aluminum conductors of uniform width comprising the only end connections of said winding.

HAMILTON D. TAYLOR.

REFERENCES CITED

The following references are of record in the file of this patent:

UNITED STATES PATENTS

| Number | Name | Date |
|---|---|---|
| 1,237,459 | Bijur | Aug. 21, 1917 |
| 2,132,274 | Savage | Oct. 4, 1938 |
| 2,167,355 | Gay | July 25, 1939 |
| 2,394,110 | Savage et al. | Feb. 5, 1946 |

FOREIGN PATENTS

| Number | Country | Date |
|---|---|---|
| 619,402 | Great Britain | Mar. 9, 1949 |